Jan. 12, 1960     H. N. EKLUND ET AL     2,921,289
POWER AND SIGNAL TRANSMISSION SYSTEM
Filed Sept. 26, 1955
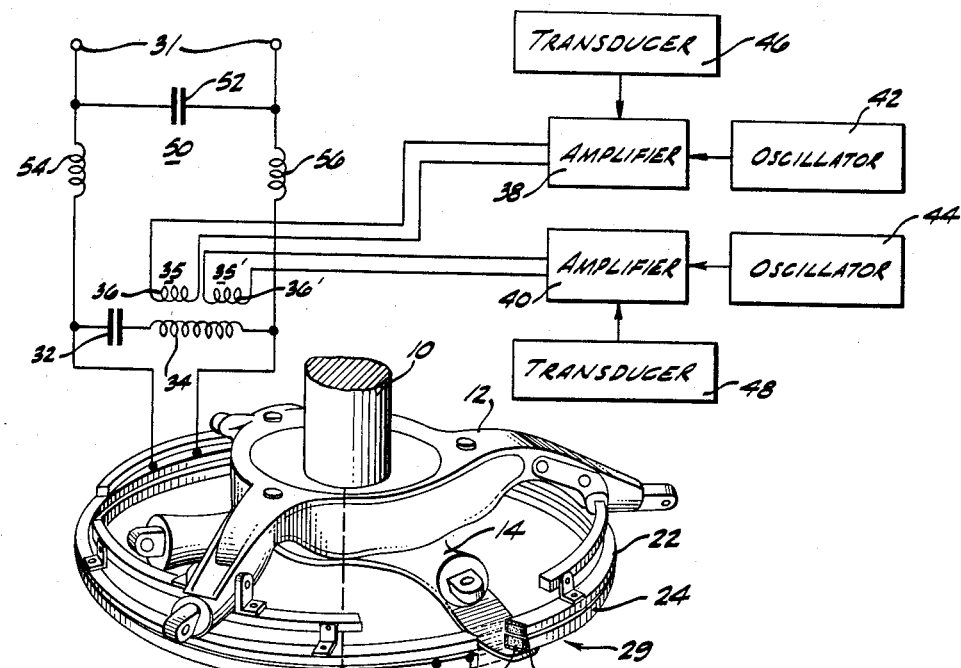
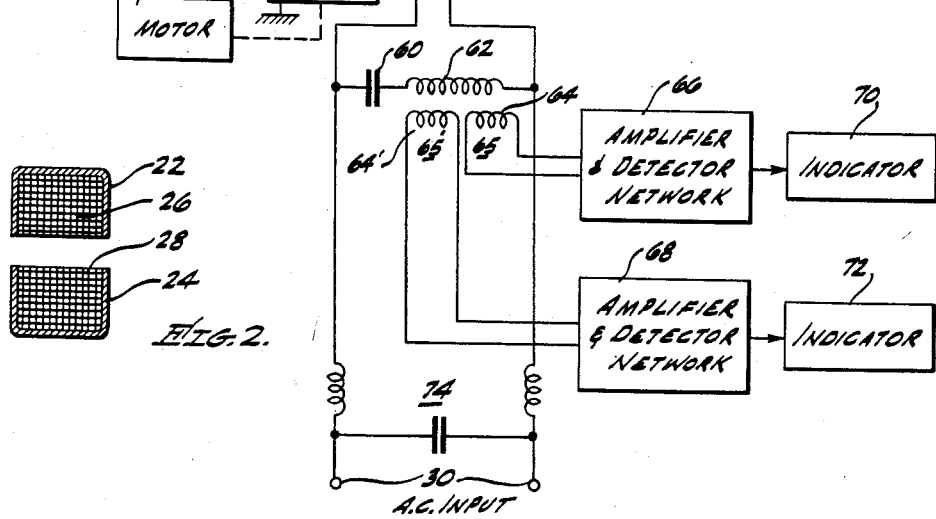
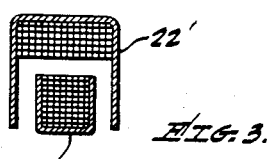
INVENTORS.
HARRY N. EKLUND,
WALTER A. SAUTER,
BY
Perry E. Turner
AGENT.

United States Patent Office 2,921,289
Patented Jan. 12, 1960

2,921,289

POWER AND SIGNAL TRANSMISSION SYSTEM

Harry N. Eklund, Pacific Palisades, and Walter A. Sauter, Topanga, Calif., assignors to Lear, Incorporated, Santa Monica, Calif.

Application September 26, 1955, Serial No. 536,532

5 Claims. (Cl. 340—27)

This invention relates to electrical power and signal transmitting apparatus, and more particularly to means for effecting transfer of power and information between fixed and movable mechanical elements such, for example, as between the fuselage and rotor of a helicopter.

In certain applications, radio telemetering arrangements are employed to transmit information about the condition of a moving element to a reference or fixed element. Where such an arrangement is employed in a helicopter to convey data, e.g., airspeed, from the rotor to the cabin or fuselage, considerable power is required to operate the radio frequency transmitter. In addition, requirements for radio silence often militate against obtaining the information when it may be most wanted. Further, present practice is to transmit the information by way of slip-ring assemblies connected between the swash plates; in such arrangements, the slip rings continually wear away and occasionally become dirty, thereby necessitating frequent attention which could well be devoted to other problems.

It is an object of this invention to provide a simple arrangement to effect power and signal transfer between fixed and moving mechanical parts, in which there is no mechanical connection or frictional engagement between the parts.

It is another object of this invention to provide an improved system for transferring power and signals between the cabin and rotor of a helicopter, which requires no transmitter such as is employed in radio telemetering arrangements, and which can be used at will without compromising security.

It is another object of this invention to provide an improved power transmission system for transferring power from the cabin of a helicopter to its rotor, which comprises relatively few parts of simple design and rugged construction, which requires a minimum of attention and replacement of parts, and which has a long and reliable operating life.

The above and other objects and advantages of this invention will become apparent from the following description taken in conjunction with the accompanying drawing, in which a preferred embodiment of the invention is illustrated by way of example. The scope of the invention is pointed out in the appended claims. In the drawing, Fig. 1 is a perspective view, partly broken away, of a unique transformer arrangement for transferring power from the fuselage to the rotor of a helicopter, and a schematic diagram of signal circuits including means for transmitting data from the rotor to the fuselage through the same transformer, in accordance with this invention, Fig. 2 is a sectional view of the construction of the transformer coils of Fig. 1, and Fig. 3 is a section view, similar to Fig. 2, of a modified construction of the transformer coils.

Briefly, this invention comprises a transformer having its windings arranged in coaxial rings located adjacent each other. One winding is secured for rotation with the rotor of a helicopter, and the other winding is fixed with respect to the fuselage. Power supplied to the fixed winding is transferred to the rotating winding by the magnetic flux linking the two coils, while signal information is transferred in a similar manner back through the rotating winding and the fixed winding to recorders in the fuselage.

Referring to Figs. 1 and 2, the shaft 10 of a helicopter rotor (not shown) extends through the centers of upper and lower swash plates 12, 14 to a gear box 16 through which it is driven by a motor 18. The gear box 16 is secured in the fuselage or cabin, indicated at 20. The upper swash plate 12 is fixed to the rotor shaft 10, and the lower swash plate 14 is held fixed with respect to the fuselage, as by being secured to the gear box 16, all in a conventional manner.

Two channel-section rings 22, 24 are coaxially arranged in close proximity with their channel openings facing each other. One ring 22 is secured for rotation with the rotor shaft, and for this purpose is fixed to the upper swash plate 12. The other ring 24 is secured to the lower swash plate to be fixed with respect to the fuselage. A coil winding 26 is secured within the channel of the upper ring 22, and a similar winding 28 is supported in the channel of the lower ring 24. The two windings 26, 28 form the windings of a transformer 29, whereby A.C. input power applied to the input terminals 30 of the lower winding 28 is transferred to the rotating upper winding 26 and its output terminals 31 for application to a suitable load (not shown), i.e., for power transfer, lower winding 28 is the primary and upper winding 26 is the secondary of the transformer.

As shown in Fig. 2, rings 22 and 24 are of the same width. However, to effect tighter electromagnetic coupling between the windings, the arrangement of Fig. 3 may be employed, wherein one ring 22' may be slightly wider than the other ring 24, and with the ends of the flanges of ring 24 extending part way into the channel of ring 22.

The advantages of the arrangement above described for transferring power from the fuselage to the rotor of a helicopter will be apparent; no frictional conductive connection is necessary to effect power transfer, and the maintenance problems associated with slip rings are eliminated.

In addition to the above arrangement for transferring power to the rotor assembly from the fuselage, and further in accordance with this invention, provision is made for the transfer of signal information from the rotor assembly to the fuselage through the same windings 26, 28. One arrangement for accomplishing this includes a capacitor 32 and inductor or coil 34 connected to form a series LC network and shunted across winding 26. Coils 36, 36' are inductively coupled to coil 34 to provide therewith transformers 35, 35' connected to the output of two amplifiers 38, 40 which amplify the oscillations developed by respective oscillators 42, 44. Respective transducers 46, 48 are coupled to the amplifiers 38, 40 and adapted to adjust or vary the gain of such amplifiers in accordance with variations in measured data. Preferably both oscillators 42, 44 operate at higher frequencies than the frequency of the input power. Under such conditions, LC network 32, 34 is selective to present a high impedance at the lower power frequency, thereby to prevent power being transferred to coils 36, 36' and impressed upon the leads in the outputs of amplifiers 38, 40. Also, to isolate the load from the signal frequencies, a low-pass filter 50 is provided by a capacitor 52 shunted across the output terminals 31 of the upper winding 26 and a pair of coils 54, 56 connected in series with the respective output terminals, as illustrated.

Shunted across lower winding 28 is a capacitor 60 and coil 62 connected in series. Signal pick-up coils 64, 64' are inductively coupled to coil 62 to provide therewith transformers 65, 65' coupling the inputs of respective amplifier and detector networks 66, 68 from which signals are applied to respective indicators 70, 72.

A low-pass filter 74, similar to the low-pass filter 50 previously described, is connected across the input terminals 30 of the lower winding 28. Filter 74 is effective to prevent transfer of the signal frequencies to the power input leads, and LC network 60, 62 similarly serves as a high impedance at the power frequency.

The LC networks and low-pass filter means above described are merely representative of suitable isolation means to prevent transfer of power to the signal circuits and transfer or loss of signals to the power transfer circuits. It will be apparent that this invention embraces any suitable arrangement to accomplish this purpose.

Operation of the above described power and signal circuits will now be explained. It will be understood that operating power for the oscillators 42, 44 and amplifiers 38, 40 may be provided by suitable connections thereto from the load connected across the output terminals 31 of the upper winding 26. With operating power thus supplied, the outputs of amplifiers 38, 40 are oscillations at the respective operating frequencies $f_1$, $f_2$ of oscillators 42, 44. The transducers 46, 48, which, for example, may be devices responsive to airspeed and rotor position, respectively, control the gain of their associated amplifiers so that the amplitudes of the oscillations therefrom correspond to the instantaneous airspeed and position. The oscillations are impressed upon respective transformers 35, 35' and transferred through transformer 29 and respective transformers 65, 65' to amplifier and detector networks 66, 68. Networks 66 and 68 are selective for signals at frequencies $f_1$ and $f_2$, respectively, and for this purpose may include suitable frequency selection means conventional in the art. In a normal manner, networks 66, 68 detect and apply to indicators 70, 72 signals which correspond to the amplitudes of the transmitted signals, whereupon the indicators are actuated to present accurate indications of the measured airspeed and position.

It will be apparent that the amplitude-modulating effect of the transducers is not an essential mode of conveying data by the oscillator carriers. Frequency-modulation can be employed as well, in which case each transducer would be adapted to control the frequency of operation of the associated oscillator; this can be achieved in a manner well-known in the art.

It should also be noted that the transformer arrangement herein described in effect provides a closed loop for the signals. Since the transformer is the means for transferring the signals, radiations associated with conventional radio telemetering arrangements are eliminated; thus, the system of this invention need not be made inoperative during periods of radio silence.

From the foregoing, it will be apparent that there has been described an arrangement employing a common transformer for the transfer of power and signal information between fixed and rotatable parts, which is uniquely adopted for supplying power to signal generating circuits associated with the rotor assembly of a helicopter, and in which the signals are transmitted through the transformer in the form of carriers suitably modulated in accordance with the magnitude of measured data.

What is claimed is:

1. In a helicopter having fixed and rotatable adjacent mounting members, wherein the rotatable mounting member is a part of the rotor assembly of the helicopter, a transformer having primary and secondary windings, said primary winding being in fixed spaced relation to the fixed mounting member, said secondary winding being secured for rotation with the rotatable mounting member, signal apparatus secured to the rotor assembly for developing signals of a first frequency representing a specific condition, means to transfer power at a second frequency from said primary winding to said secondary winding, first means connected between said secondary winding and said signal apparatus to supply power to said signal apparatus for operation thereof, means coupled to said signal apparatus to impress said signals upon said secondary winding, and respective means coupled to said primary winding and said secondary windings to separate currents of the power and signal frequencies.

2. In a helicopter rotor assembly which includes an upper swash plate supported for rotation with the rotor blades and a lower swash plate held fixed with respect to the fuselage, a combined power and signal transfer system comprising a transformer having first and second windings, said first winding being secured to said lower swash plate, said second winding being secured to said upper swash plate, whereby said second winding rotates with said upper swash plate and relative to said first winding, means to supply power at a first predetermined frequency to said first winding, a source of signals of a second predetermined frequency coupled to said second winding, frequency selective means for the first predetermined frequency coupled to said second winding and operable to supply power to said source for operation thereof, frequency selective means for the second predetermined frequency coupled to said first winding and operable to extract said signals from said first winding.

3. The system defined in claim 2, including first and second coaxial channel-section rings, said first ring being secured to said upper swash plate and said second ring being secured to said lower swash plate, said first winding being supported in said first ring, said second winding being supported in said second ring, and the channels of said first and second rings facing each other to effect tight coupling between said windings.

4. The system defined in claim 3, wherein the channel of said second ring is narrower than the channel of said first ring, and wherein said second ring extends partially into the channel opening of said first ring.

5. In combination, fixed and movable mechanical elements, a transformer having one winding secured to said fixed element and another winding secured to said movable element, a power source coupled to said one winding for transferring power at a first predetermined frequency to the other winding, a source of modulated signals of a second predetermined frequency mechanically fixed to said movable element and electrically connected to said other winding, respective means to separate currents of said first and second predetermined frequencies in said windings whereby said one winding constitutes the primary winding of said transformer for power transfer between said windings and said other winding constitutes the primary winding of said transformer for transfer of signal information, and means coupled to said one winding for extracting said signals and presenting an indication thereof.

References Cited in the file of this patent
UNITED STATES PATENTS

| 2,039,405 | Green et al. | May 5, 1936 |
| 2,313,682 | Stuart | Mar. 9, 1943 |
| 2,384,484 | Norden | Sept. 11, 1945 |
| 2,432,982 | Braddon | Dec. 23, 1947 |
| 2,609,531 | Kirchner | Sept. 2, 1952 |
| 2,713,156 | Guarino | July 12, 1955 |